(12) United States Patent
Caprera

(10) Patent No.: US 6,988,708 B2
(45) Date of Patent: Jan. 24, 2006

(54) LOW TORQUE BALL VALVE SEAT

(75) Inventor: Brian J. Caprera, Warwick, RI (US)

(73) Assignee: Dresser, Inc., Addison, TX (US)

( * ) Notice: Subject to any disclaimer, the term of this patent is extended or adjusted under 35 U.S.C. 154(b) by 70 days.

(21) Appl. No.: 10/679,962

(22) Filed: Oct. 6, 2003

(65) Prior Publication Data

US 2005/0072953 A1    Apr. 7, 2005

(51) Int. Cl.
*F16K 1/00*    (2006.01)

(52) U.S. Cl. .................. 251/171; 251/192; 251/315.01; 251/317

(58) Field of Classification Search ........ 251/170–174, 251/192, 306, 315.01, 314, 316, 317
See application file for complete search history.

(56) References Cited

U.S. PATENT DOCUMENTS

| | | | |
|---|---|---|---|
| 3,067,977 A | 12/1962 | Anderson et al. | |
| 3,380,706 A * | 4/1968 | Domer | 251/148 |
| 3,394,915 A | 7/1968 | Gachot | |
| 3,488,033 A | 1/1970 | Priese | |
| 3,497,176 A | 2/1970 | Priese | |
| 3,801,066 A * | 4/1974 | Miles et al. | 251/306 |
| 3,834,663 A | 9/1974 | Donnelly | |
| 4,044,994 A | 8/1977 | Priese | |
| 4,111,393 A | 9/1978 | McClurg et al. | |
| 4,114,856 A * | 9/1978 | MacAfee et al. | 251/306 |
| 4,157,170 A | 6/1979 | McClurg | |
| 4,195,815 A * | 4/1980 | Stager | 251/306 |
| 4,210,313 A | 7/1980 | Chester | |
| 4,215,846 A | 8/1980 | Ishizuka et al. | |
| 4,228,816 A * | 10/1980 | Aoki | 137/72 |
| 4,231,546 A | 11/1980 | Eggleston et al. | |
| 4,281,817 A | 8/1981 | Adams et al. | |
| 4,378,104 A * | 3/1983 | Ben-Ur | 251/173 |
| 4,513,946 A | 4/1985 | Priese | |
| 4,557,461 A | 12/1985 | Gomi et al. | |
| 4,660,591 A | 4/1987 | Brown et al. | |
| 4,671,308 A * | 6/1987 | Williams et al. | 137/72 |
| 4,899,980 A * | 2/1990 | Kemp | 251/175 |

(Continued)

FOREIGN PATENT DOCUMENTS

FR    2 513 343 A    3/1983
GB    1 443 887 A    7/1976

OTHER PUBLICATIONS

Masoneilan Catalog BN6004 showing 36004 Paramax Flanged Control Ball Valve with MN-7 Flexible PTFE Valve Seat (2 pages).
Fisher Controls VEE-Ball Rotary Control Valve instruction manual showing the PTFE Valve Seat "composition ball seal" (1 page).
International Search Report for PCT/US2004/030633, mailing date Jan. 21, 2005, 4 pages.

*Primary Examiner*—J. Casimer Jacyna
(74) *Attorney, Agent, or Firm*—Fish & Richardson P.C.

(57) ABSTRACT

A ball has a valve body defining an inner cavity and a fluid inlet and fluid outlet, a control ball element rotatably mounted in the inner cavity, and having a segment defining a ball face, and a flexible valve seat positioned in the valve body. The seat comprises a base portion, a cantilevered portion with a sealing face disposed toward the ball face, and a connecting portion between the base portion and the cantilevered portion that is lesser in width than are the base portion and the cantilevered portion.

13 Claims, 2 Drawing Sheets

U.S. PATENT DOCUMENTS

| | | |
|---|---|---|
| 5,137,259 A | 8/1992 | Stein |
| 5,392,826 A | 2/1995 | Saville et al. |
| 5,685,520 A * | 11/1997 | Velan .................. 251/306 |
| 5,904,337 A | 5/1999 | VanKirk et al. |
| 6,533,241 B1 | 3/2003 | Chen |
| 6,840,502 B2 * | 1/2005 | Haushaelter et al. ........ 251/173 |

* cited by examiner

LOW TORQUE BALL VALVE SEAT

TECHNICAL FIELD

This application relates to a ball valve and a flexible seat used inside such a valve. In particular, the seat is a dual-ring structure having an outer ring connected to an inner ring by an area of reduced cross-section so that the inner ring is cantilevered from the outer ring to place the inner ring into contact with the face of the ball.

BACKGROUND

Ball valves are a very popular choice for a variety of applications in which fluid control is needed—both to shut off the flow and to control the amount of flow. At its most basic level, a ball valve is simply a spherical plug (a ball) mounted to rotate inside a valve body or housing, where a cylindrical flow path has been provided in the valve body and through the ball. The valve body may be mounted between two pipes so that the valve may control the flow of fluid through the pipes. When the flow path through the ball is positioned completely transverse to the flow path through the valve body, there will be no flow. When the flow paths through the body and ball are aligned longitudinally with each other, there will be maximum flow. When the valve is between full-open and full-closed, the flow will be throttled because only a portion of the flow path through the ball will be aligned with the flow path through the valve body. Generally, the ball rotates under the control of a shaft that extends from a connection on the ball inside the valve body to the outside of the valve body. The shaft can have a handle mounted on it for manual operation, or it may be driven by an actuator.

When the valve is fully closed, it is desirable that no fluid be allowed to pass from the upstream portion of the valve body to the downstream portion, either through the ball or around the ball. As a result, it is common to use various techniques to create a seal between the ball and the valve body. The seal between the ball and the valve body is typically produced by placing a ring-shaped flexible seat around the periphery of the flow path against the upstream face of the ball. The inner edge of the seat is held in place against the ball and flexes with irregularities in the shape of the ball, when the ball is rotated, to provide a consistent and adequate seal. The seat can be held in place, so that it does not fall out of the valve or get swept into the fluid flow, by pressing a retaining ring against it along its outer edge.

Various forces combine to resist rotation of a ball valve, and thus require additional strength from a human operator or an actuator. Frictional forces—both static and dynamic—between various moving parts in a valve are a major contributor to the resistance of rotation. One of the major frictional forces occurs between the flexible seat and the ball face. The seat must be positioned sufficiently close to the ball face so that the two stay in sealed contact even when the seat and the ball are at their greatest distance relative to each other due to dimensional variations that cannot be eliminated from the valve (such as eccentricities in the rotational radius of the ball). In addition, pressure of the process fluid on the upstream side of the seat can increase or decrease the force between the seat and the ball face, and thereby affect the frictional forces that resist rotation of the valve. A valve needs to be designed so that it is positively sealed under the worst-case for tolerances and low upstream pressure (even as the sealing surface of the seat wears down over time). As a consequence, when the upstream fluid is at high pressure and the seal tolerances are at their tightest, the friction between the sealing surface and the ball is at a maximum. These design considerations should be taken into account while minimizing the rotational force required to operate the valve, because increased force requires stronger and more expensive actuators, especially for large valves.

Therefore, it is desirable to have a seat for a ball valve that provides a good seal without exerting excessive friction on the ball segment, that maintains an adequate sealing force across a range of seat wear, and that is compatible with a variety of fluids across a wide range of temperatures and pressures.

SUMMARY

In general, a ball valve and a seat for use in a ball valve are disclosed. The seat may be provided with multiple sections, where one section is anchored in the valve body and another cantilevers inward from a connecting section of reduced width.

In one embodiment, a ball valve is described. The valve comprises a valve body defining an inner cavity and having a fluid inlet and fluid outlet, a control ball element having a segment defining a ball face rotatably mounted in the inner cavity, and a flexible valve seat positioned in the valve body. The seat comprises a base portion, a cantilevered portion, and a connecting portion between the base portion and the cantilevered portion that is lesser in width than are the base portion and the cantilevered portion. The cantilevered portion includes a sealing face disposed toward the ball face. The valve may also comprise a retaining ring that presses against the base portion to hold the valve seat in place and limit the motion of the valve seat toward the ball face.

The retaining ring may define an inner diameter that is smaller than an inner diameter defined by the valve seat, and a rigid support ring may be held between the base portion and the valve body. In addition, the connecting portion may have a concave front face and a substantially flat rear face. In addition, the cantilevered portion may include a sealing face angularly disposed toward the valve inlet. The cantilevered portion may have a width that is constant or that increases moving away from the sealing face. The sealing face may also be formed at an angle approximating the angle of the ball face where the sealing face contacts the ball face.

In another embodiment, a resilient ring-like seat for a ball valve is disclosed. The seat comprises a base portion, a cantilevered portion, and a connecting portion between the base portion and the cantilevered portion that is thinner than are the base portion and the cantilevered portion. The connecting portion may have a concave front face and a substantially flat rear face, and the front face may comprise a smooth arc. The cantilevered portion may comprise a sealing face of substantially constant width configured to contact a ball face of a ball valve, or a slightly increasing cross-section moving away from the sealing face. The sealing face may be formed at an angle that approximates the angle of a ball face where the sealing face is to contact the ball face. The cantilevered portion may also have a substantially flat top edge. For its part, the base portion may define a substantially flat bottom edge, a substantially flat front edge, and a substantially flat rear edge. The seat may be formed from PTFE or another appropriate material or materials.

The details of one or more embodiments of the invention are set forth in the accompanying drawings and the descrip-

DESCRIPTION OF DRAWINGS

Like reference symbols in the various drawings indicate like elements.

DETAILED DESCRIPTION

Figure 1:
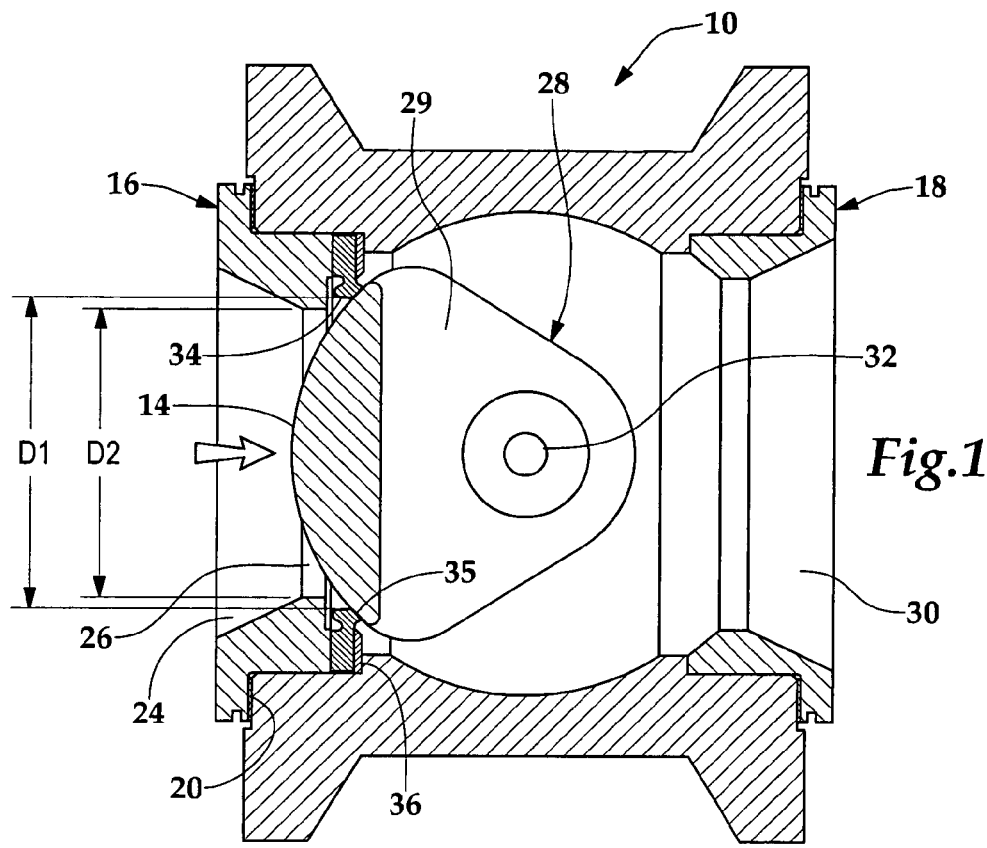
FIG. 1 is a sectional view of a ball valve having a cantilevered seat of the present invention.

FIG. 1 is a sectional view of a ball valve 10 having a cantilevered seat 34. The valve 10 has a valve body 12 that defines a central inner cavity in which a segmented ball valve element 28 is mounted. The ball valve element 28 includes a ball segment having a ball face 14. The ball valve element 28 is able to rotate on a shaft 32 that extends from an ear 29 on the ball valve element 28 to a location exterior of the valve body 12. Outside of valve body 12, a handle may be attached to the shaft 32 so that shaft 32 can be rotated manually, or an actuator may be attached to shaft 32 to permit automatic or semi-automatic operation and control of the valve 10, such as by a computer-controlled closed-loop automation system or by a switch directly connected to the actuator.

Rotation of ball valve element 28 controls the amount of fluid that can flow through valve 10. As shown in FIG. 1, valve 10 is in a full-closed position, with ball valve element 28 completely blocking a flow path between flow passage 24 on the intake, or upstream, side of valve 10, and flow passage 30 on the output, or downstream, side of valve 10. Ball valve element 28 may be rotated, for example counterclockwise, so that the cavity within valve body 12 is in fluid communication with flow passage 24 along the top edge of ball valve element 28. Fluid will then begin to seep through the open space. As the ball valve element 28 continues its rotation, the valve 10 opens more and more, until the ball valve element 28 has rotated ninety degrees and is disposed to provide the maximum fluid flow path.

A seat 34 formed as a resilient ring is placed in valve body 12 so as to sit tightly against the ball face 14 around the periphery of flow passage 24. The seat 34 has a base area, a cantilevered area, and a connecting area of reduced width relative to the base area and the cantilevered area, as described in more detail below. A retaining ring 16 can fasten to valve body 12 and thereby hold seat 34 in place against ball face 14. The retaining ring 16 can also be removed to allow for maintenance, adjustment, and replacement of seat 34, and even of ball valve element 28. Another retaining ring 18 may be provided on the outlet side of valve body 12. The retaining rings 16, 18 may have their inner edges formed or machined, such as in a smooth bellows form, so as to promote smooth fluid flow into and out of valve 10. The rings 16, 18 may each have a throat or flow passage 24, 30 through which fluid flows to enter and leave the valve.

Seat 34 defines a first diameter, $D_1$, and retaining ring 16 defines a second diameter $D_2$. $D_1$ is larger than $D_2$, so that the inner edge of seat 34 is recessed out of the way of the main fluid path as it flows through valve 10. In this manner, seat 34 has a minimal disruptive effect on the fluid flow.

Also, when the valve 10 is open to even a minor degree, the sealing face 35 of the seat 34 that is on the opening side of the valve will no longer be pressed against the ball face 14, and will be hanging freely. Thus, there can be a danger that the seat 34 will be drawn into the fluid flow, and dislodged from its intended location. As shown in FIG. 1, however, in the present invention, the seat 34 is held out of the way of the fluid flow, so that it will receive few disruptive forces. As a result, the upstream pressure holds seat 34 in place. Additionally, natural forces maintaining the hoop-shape of the retaining ring can prevent seat 34 from being dislodged.

Also, gaskets 20, 22 may be provided between retaining rings 24, 30 and valve body 12 to prevent fluid from leaking out of the valve body 12. The gaskets 22 may take the form of a thin washer-like structure, and may be constructed from a variety of materials, including rubber, flexible graphite, and fiber reinforced plastic.

While the seat 34 is held in place on its front side by retaining ring 16, it may have a support ring 36 placed against its back side to support compression loads from the retaining ring 16. This support ring allows for the valve body 12 to have a larger opening to ease valve assembly, and may prevent the innermost edge of the seat 34 from flexing too far back toward ball face 14. The seat 34 could also be supported from overflexing on its back side merely by disposing valve body 12 father upstream toward seat 34. Use of a support ring 36, however, provides additional flexibility, as worn rings may be replaced, and rings of different sizes can be used in various applications or over the life of the valve 10.

The size of support ring 36 may be used to adjust the degree of contact between the sealing face 35 of seat 34 and ball face 14. The support ring 36 may be constructed, for example, from a metal such as aluminum, or from a plastic that is compatible with the fluid temperature and fluid type to pass through the valve. The support ring 36 carries the compressive load of the retaining ring 16 and partially supports the seat 34 against pressure differential. The support ring 36 should have an inside diameter equal to or smaller than the seat 34. The bore through of the valve body 12 (with the support ring 36 removed) is generally large enough that the ball valve element 28 may pass through on assembly. No retaining ring is shown on the downstream end of valve 10; rather, a slightly raised face is provided, having the same diameter as the upstream retaining ring 16.

Figure 2:
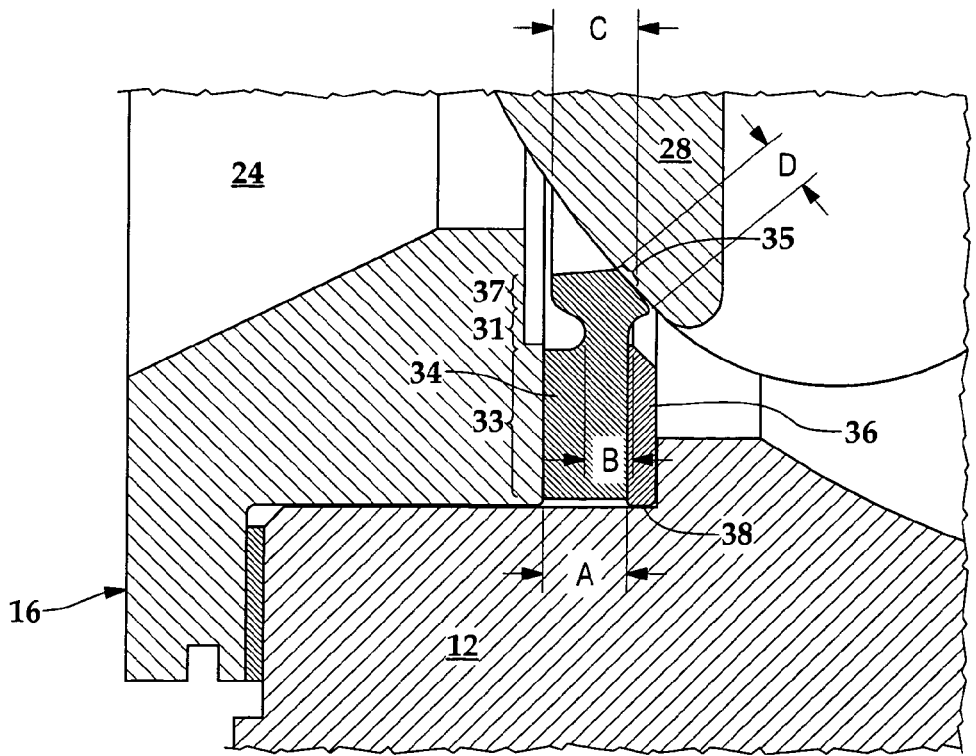
FIG. 2 is a sectional view of a portion of a ball valve of FIG. 1.

FIG. 2 is a sectional view of a portion of ball valve 10 of the present invention. In particular, FIG. 2 shows a close-up of one side of the flow passage 24 on the upstream side of valve 10. Valve body 12 is shown as the outer component of an assembly that includes retaining ring 16, seat 34, support ring 36, and ball valve element 28.

Ball valve element 28 is in sealed contact with the sealing face 35 of seat 34. As shown, seat 34 has three sections: a base section 33, a connecting section 31, and a cantilevered section 37. Although the sections or portions are denoted as distinct sections, they need not have sharp transitions, and the sections could overlap with each other.

Base section 33 is generally rectangular in shape, with a flat front (or upstream) side, a flat back side, and a flat bottom. The front side may match the dimension of a lip that extends back from the retaining ring 16. As such, it fits squarely within an annular channel formed by the retaining ring 16, the valve body 12, and the support ring 36. When the valve is installed, the retaining ring 16 bottoms out on the valve body 12, and any gap between the seat 34 and the body 10 may be closed. The gap between retaining ring 16 and valve body 12 is slightly larger, so that the seat 34 is pinched sufficiently so that the valve 10 is sealed against any expected pressure differential, with allowance for the various manufacturing dimensional tolerances. The width of base section 33 is substantially constant from top to bottom, and is designated in FIG. 2 as "A."

Cantilevered section 37 is at the inner edge of the rings that make up seat 34. Cantilevered section 37 has a sealing face 35 that is in contact with the face of ball valve element 28, and is angled to match the cuvature of ball valve element 28 when the seat is fully compressed, so that there is some appreciable contact area to make a seal. The width of the cantilevered section, denoted "C," may be appropriately sized and may have a constant width or a varying width. A portion of cantilevered section 37 extends laterally from the back area of seat 34 toward ball valve element 28 and terminates in the sealing face 35 that is in contact with the ball valve element 28. As shown by dimension "D," this extending portion narrows slightly as it approaches its face 35. As a result, the contact area between the seat 34 and the ball valve element 28 will increase as the sealing face 35 of the seat 34 wears away. The width of the extending portion could also be made constant, however. In addition, the area of the sealing face 35 could be constructed from, or coated by, a material that differs from the rest of seat 34, such as to provide better wear or frictional attributes. For example, a suitable coating could include Teflon, graphite, or molybdenum-based dry-film coating. The ball contact face may be sized for optimum compressive stress (greater unit load than pressure differential, less than compressive/creep strength), when in full contact with the ball, with the sum of the load from design interference and maximum pressure differential.

The connecting section 31 is between the base section 33 and the cantilevered section 37. As shown by dimension "B," the connecting section 31 has a portion that is narrower than portions of base section 33 and cantilevered section 37. In FIG. 2, this narrowed portion is formed by having a concave curved surface on the front, or upstream, side of the connecting section 31, and a flat surface on the back. In this manner, the cantilevered section 37 may flex in the upstream direction when urged to do so by the contact with ball valve element 28. The connecting section 31, could take a variety of forms in addition to that shown in FIG. 2. For example, the connecting section 31, could be flat on both sides, and a series of circular grooves could be cut into the upstream side to create multiple areas of reduced width, and thereby allow for forward bending of the cantilevered section 37. Alternatively, the connecting section 31, could be formed of a flexible ring, such as a metal ring, having an outer edge that extends into the base section 33, and an inner edge that extends into cantilevered section 37. In other words, base section 33 and cantilevered section 37 could be separate rings that are joined by a flexible washer. In addition, a descending portion (not shown) could be provided on the front edge of cantilevered portion 37, so that it contacts the top edge of base section 33 when the seat 34 has reach a point of maximum flexure. By contact with the base section 33, the descending portion would resist further movement of the cantilevered section 37. The connecting section 31 may be selected to be flexible enough to allow deflection of the cantilevered section 37 with minimal effect on the attitude of the cantilevered section 37, while being stiff enough to support maximum pressure differential at maximum temperature without yielding. The radial length of connecting section 31 is balanced with the ball contact face 35 to provide enough unit load to make a seal throughout the valve pressure range without yielding.

The overall height of seat 34 is relatively small. As a result, the seat 34 does not require extra area in valve body 12, and can avoid extending into the fluid flow path. Also, there is little surface area of the seat 34 that is subjected to a pressure drop between the pressure of fluid in front of the seat 34, and the area behind seat 34. Because of this, the pressure that seat 34 exerts against control ball element 28 at high fluid pressure differentials is relatively small, so that frictional forces that resist movement of the ball valve element 28 can be minimized.

Support ring 36 is clamped into place behind seat 34, and helps to prevent seat 34 from flexing backward in the downstream direction excessively. The support ring 36 is tapered at its back inner edge to prevent it from interfering with ball valve element 28. The support ring 36 could be made from a relatively stiff metal, such as aluminum, carbon steel, stainless steel, Monel, Inconel, and Hastelloy, or other appropriate material. The axial width of the support ring 36 can be selected so as to provide the appropriate back-force on seat 34 without yielding against the sum of maximum pressure differential load and retainer compressive load.

Figure 3:
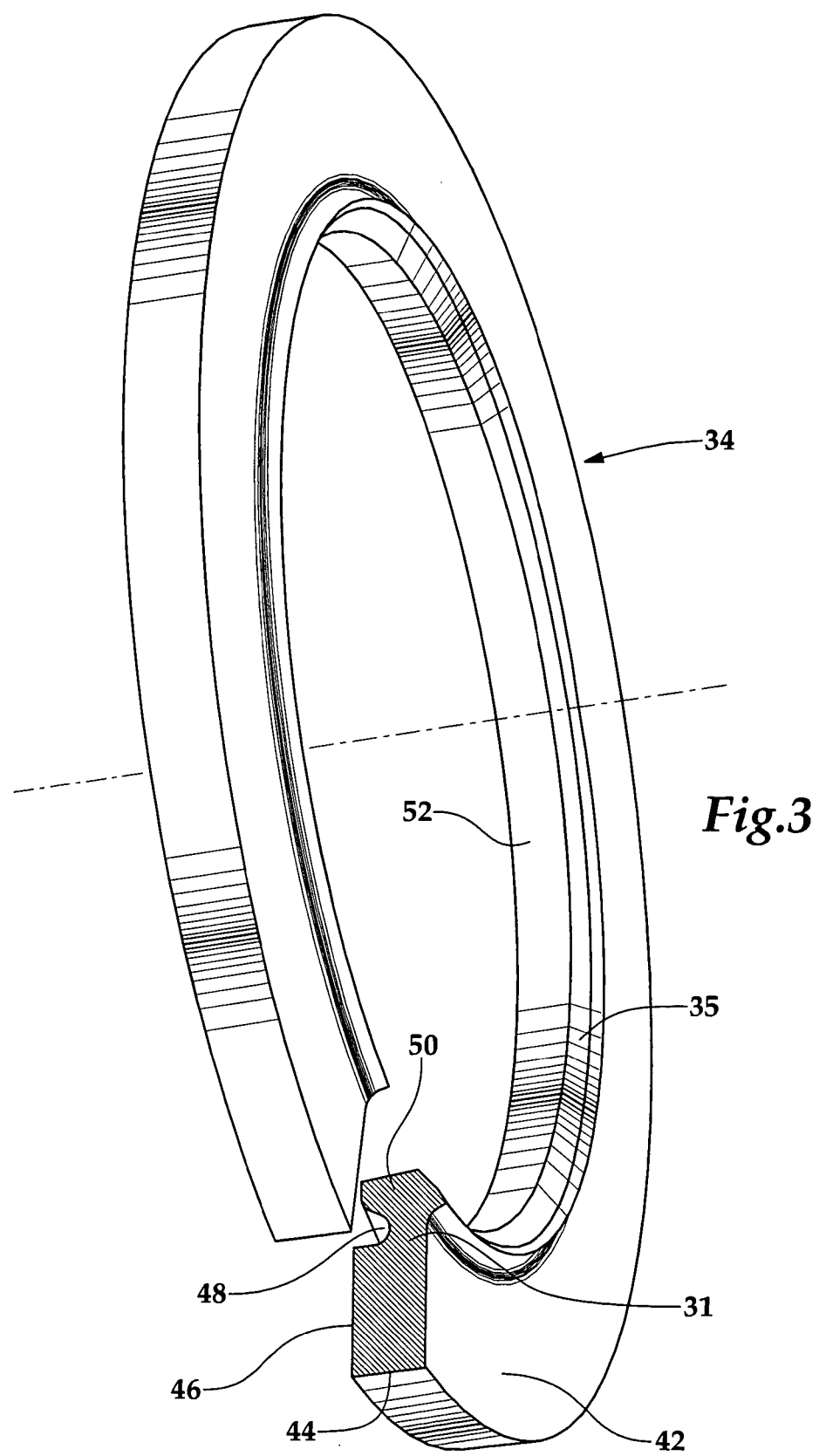
FIG. 3 is a perspective view in partial cross section of a ball valve seat.

FIG. 3 is a perspective view in partial cross section of a ball valve seat 34, with the upstream side of the seat 34 to the left, and the downstream side to the right. The figure shows the top, inner edge 52 on the cantilevered section, and the sealing face 35 on the right of that section. The material behind face 35 may be the same as the remainder of seat 34, or may be made of a different material or coated with a different material. For example, the material could have greater wear resistance than the rest of seat 34 or a lower coefficient of friction. As one example, the face 35 may be made up of a Teflon coating or other similar coating. Also, the material may consist of a portion of material that is molded with the remaining portions of seat 34 or that is adhered to the remainder of seat 34. Such a material could include polyetheretherketone (PEEK), ultra high molecular weight polyethylene (UHMPE), Delron, Nylon, polyimide, polyamide or other bearing material. These materials may be filled with behavior modifying particulate such as glass, graphite, and carbon.

The base section is defined by a front wall 46, a bottom wall, 44, and a back wall 42, so as to fit into the valve body, as shown in FIG. 2. The base section could also take a variety of other forms, and could have a width that is equal to, or even smaller than, the narrowest part of the connecting section, such as if the valve body is configured in a manner that would hold the base section tight and still permit the cantilevered section to flex sufficiently. The base section may be sized for adequate compression to seal against maximum pressure differential with allowance for dimensional manufacturing tolerance.

The connecting section 31 lies between the back wall 42 and a front concave wall 48. As shown, the front concave wall 48 forms a continuous curve that cuts inward from the base section, and then curves upward and away from the base section, into the cantilevered section. As a result, the connecting section creates a thin area, or membrane, that can serve as an area of axial deflection for the seat 34 when it is fixed in a valve, so that the cantilevered section floats on the ball valve element's face. Also, the seat 34 may be placed in a new valve so that the connecting section is initially under fairly extensive deformation. As the sealing face 35 wears away, the deformation may decrease, and the seat 34 may still maintain the sealing face 35 in contact with the face of the ball valve element. The shape of the transition from back wall 42 to sealing face 35 may be configured to evenly distribute tensile stress from design interference and pressure differential.

The seat 34 may be fabricated by machining from a solid billet of material, molded or sintered into a near net shape and finish machined, or molded or sintered into the finished shape, or any relevant combination of these steps. It could be a fabricated composite of multiple materials but a single-material design allows the advantages discussed above.

A number of embodiments of the invention have been described. Nevertheless, it will be understood that various modifications may be made without departing from the spirit and scope of the invention. For example, the seat may take a variety of shapes and may be used in different ways in a valve. Accordingly, other embodiments are within the scope of the following claims.

What is claim is:

1. A ball valve, comprising:
   a valve body defining an inner cavity and having a fluid inlet and fluid outlet;
   a control ball element rotatably mounted in the inner cavity, and having a segment defining a ball face;
   a flexible annular valve seat positioned in the valve body, the seat comprising a base portion, a cantilevered portion having a sealing face disposed toward the ball face, and a connecting portion between the base portion and the cantilevered portion that is lesser in width than are the base portion and the cantilevered portion; and
   a retaining ring removably disposed in the fluid inlet of the valve body, said retaining ring contacting the base portion of the valve seat and securing the valve seat in place, said retaining ring defining an inner diameter that is smaller than an inner diameter defined by the valve seat; and
   a rigid support ring disposed between a downstream side of the base portion of the valve seat and the valve body.

2. The ball valve of claim 1, wherein the valve seat defines a central longitudinal axis substantially co-axial with a central longitudinal axis of the fluid inlet and fluid outlet, and further wherein the connecting portion has greater flexibility along the longitudinal axis than does the cantilevered portion.

3. The ball valve of claim 1, wherein the cantilevered portion has a substantially constant width moving away from the sealing face.

4. A ball valve comprising:
   a valve body defining an inner cavity and having a fluid inlet and fluid outlet;
   a control ball element rotatably mounted in the inner cavity, and having a segment defining a ball face;
   a flexible annular valve seat positioned in the valve body, the seat comprising a base portion, a cantilevered portion having a sealing face disposed toward the ball face, and a connecting portion between the base portion and the cantilevered portion that is lesser in width than are the base portion and the cantilevered portion, wherein the cantilevered portion has a slightly increasing width moving away from the sealing face; and
   a retaining ring removably disposed in the fluid inlet of the valve body, said retaining ring contacting the base portion of the valve seat and securing the valve seat in place, said retaining ring defining an inner diameter that is smaller than an inner diameter defined by the valve seat.

5. A ball valve comprising:
   a valve body defining an inner cavity and having a fluid inlet and fluid outlet;
   a control ball element rotatably mounted in the inner cavity, and having a segment defining a ball face;
   a flexible annular valve seat positioned in the valve body, the seat comprising a base portion, a cantilevered portion having a sealing face disposed toward the ball face, and a connecting portion between the base portion and the cantilevered portion that is lesser in width than are the base portion and the cantilevered portion, wherein the sealing face is formed at an angle approximately the same as the angle of the ball face at the point where the sealing face contacts the ball face; and
   a retaining ring removably disposed in the fluid inlet of the valve body, said retaining ring contacting the base portion of the valve seat and securing the valve seat in place, said retaining ring defining an inner diameter that is smaller than an inner diameter defined by the valve seat.

6. A flexible annular seat for a ball valve, said seat comprising:
   a base portion adapted to contact a retaining ring removably disposed in a fluid inlet of said valve, wherein an inner diameter defined by the valve seat is larger than an inner diameter defined by the retaining ring;
   a cantilevered portion with a sealing face configured to be disposed against a control ball element of said valve, wherein the cantilevered portion has a slightly increasing width moving away from the sealing face; and
   a connecting portion between the base portion and the cantilevered portion that is thinner than the base portion and the cantilevered portion.

7. The seat of claim 6, wherein the cantilevered portion comprises a substantially flat top edge.

8. A flexible annular seat for a ball valve, said seat comprising:
   a base portion adapted to contact a retaining ring removably disposed in a fluid inlet of said valve, wherein an inner diameter defined by the valve seat is larger than an inner diameter defined by the retaining ring;
   a cantilevered portion with a sealing face configured to be disposed against a control ball element of said valve, wherein the sealing face is formed at an angle that approximates the angle of a ball face at a point where the sealing face contacts the ball face; and
   a connecting portion between the base portion and the cantilevered portion that is thinner than the base portion and the cantilevered portion.

9. The seat of claim 8, wherein the connecting portion has a concave front wall and a substantially flat back wall.

10. The seat of claim 9, wherein the concave front wall comprises a smooth arc.

11. The seat of claim 8, wherein the cantilevered portion has a substantially constant width moving away from the sealing face.

12. The seat of claim 8, wherein the seat is formed from PTFE.

13. A flexible annular seat for a ball valve, said seat comprising:
   a base portion adapted to contact a retaining ring removably disposed in a fluid inlet of said valve, wherein an inner diameter defined by the valve seat is larger than an inner diameter defined by the retaining ring, and wherein the base portion defines a substantially flat bottom edge adapted to contact the fluid inlet of the valve, a substantially flat front edge adapted to contact the retaining ring, and a substantially flat rear edge adapted to contact a support ring disposed downstream of the seat;
   a cantilevered portion with a sealing face configured to be disposed against a control ball element of said valve; and
   a connecting portion between the base portion and the cantilevered portion that is thinner than the base portion and the cantilevered portion.

* * * * *